(12) United States Patent
Romain

(10) Patent No.: US 8,321,691 B2
(45) Date of Patent: Nov. 27, 2012

(54) EMA PROTECTION OF A CALCULATION BY AN ELECTRONIC CIRCUIT

(75) Inventor: Fabrice Romain, Rians (FR)

(73) Assignee: STMicroelectronics S.A., Montrouge (FR)

( * ) Notice: Subject to any disclaimer, the term of this patent is extended or adjusted under 35 U.S.C. 154(b) by 929 days.

(21) Appl. No.: 11/713,887

(22) Filed: Mar. 5, 2007

(65) Prior Publication Data

US 2007/0206785 A1    Sep. 6, 2007

(30) Foreign Application Priority Data

Mar. 6, 2006   (FR) ...................................... 06 50766

(51) Int. Cl.
*G06F 21/00*    (2006.01)
(52) U.S. Cl. ........................................................ 713/194
(58) Field of Classification Search .............. 380/28–29; 713/194
See application file for complete search history.

(56) References Cited

U.S. PATENT DOCUMENTS

| | | | | |
|---|---|---|---|---|
| 6,347,383 | B1 * | 2/2002 | Elnozahy | 714/53 |
| 7,483,824 | B1 * | 1/2009 | Hill | 703/14 |
| 2004/0260932 | A1 * | 12/2004 | Blangy et al. | 713/189 |
| 2005/0149595 | A1 * | 7/2005 | Fischer et al. | 708/492 |
| 2005/0188218 | A1 * | 8/2005 | Walmsley et al. | 713/200 |
| 2006/0177052 | A1 | 8/2006 | Hubert | |

FOREIGN PATENT DOCUMENTS

| | | |
|---|---|---|
| EP | 1308885 A1 | 5/2003 |
| EP | 1 548 687 A1 | 6/2005 |

OTHER PUBLICATIONS

French Search Report from French Patent Application 06/50766, filed Mar. 6, 2006.
Joye M. "Recovering Lost Efficiency of Exponentiation Algorithms on Smart Cards" Electronics Letters, IEE Stevenage, GB, vol. 38, No. 19, Sep. 12, 2002, pp. 1095-1097, XP006019065 ISSN: 0013-5194.
May D. et al. "Random Register Renaming to Foil DPA" Cryptographic Hardware and Embedded Systems, 3$^{rd}$ International Workshop, CHES 2001, Paris, France, May 14-16, 2001 Proceedings, Lecture Notes in Computer Science, Berlin: Springer, DE, vol. vol. 2162, May 14, 2001, pp. 28-38, XP001061158 ISBN: 3-540-42521-7.

* cited by examiner

*Primary Examiner* — Brandon Hoffman
*Assistant Examiner* — Anthony Brown
(74) *Attorney, Agent, or Firm* — Wolf, Greenfield & Sacks, P.C.

(57) ABSTRACT

A method for masking a digital quantity used by a calculation executed by an electronic circuit and including several iterations, each including at least one operation which is a function of at least one value depending on the digital quantity, the method including at least one first step of displacement of at least one operand of the operation in a storage element selected independently from the value.

20 Claims, 4 Drawing Sheets

8,321,691 B2

EMA PROTECTION OF A CALCULATION BY AN ELECTRONIC CIRCUIT

BACKGROUND OF THE INVENTION

1. Field of the Invention

The present invention generally relates to electronic circuits and, more specifically, to the protection of secret quantities manipulated by such circuits, in particular against attacks by measurements of an electromagnetic radiation.

An example of application of the present invention relates to smart cards.

2. Discussion of the Related Art

FIG. 1 very schematically shows a smart card 1 of the type to which the present invention applies, as an example. An integrated circuit chip 10 is inserted into plastic card 1 and is connected to electric contacts 3 for communication with a card reader (not shown). The card may also be provided with a contactless communication system (electromagnetic transponder).

FIG. 2 is a schematic block diagram illustrating components of an integrated circuit 10 of a smart card of FIG. 1. Circuit or chip 10 comprises a central processing unit 11 (CPU), one or several non-volatile storage elements 12 (NVM), and one or several volatile storage elements 13 (for example, of RAM or registers type). The different components of chip 10 communicate together and with an input/output device 14 (I/O) connected to contacts 3, over one or several data, address, and control buses 15. Most often, chip 10 comprises other functions 16 (FCT), for example, circuits performing cryptographic operations.

The present invention more specifically applies to electronic circuits manipulating quantities intended to remain secret, that is, which should not be accessible from the outside of the circuit at least for an unauthorized user. Cryptographic calculations are used for security functions such as authentications, electronic signatures, etc. Such calculations use secret keys that persons attempting to fraud try to discover.

Many methods are known to attempt discovering digital quantities manipulated by an electronic circuit, be it a processor such as illustrated in FIG. 2 or a circuit in wired logic, reprogrammble (FPGA) or not.

A first category of attacks comprises exploiting intentional malfunctions of the circuit. Such attacks known as DFA attacks (Differential Fault Analysis) interpret results provided by the electronic circuit after disturbances in its operation. Such disturbances may result from parasitic peaks on the circuit power supply (glitch attacks), from light rays, thermal shocks, etc.

A second category of attacks to which the present invention applies relates to so-called hidden-channel attacks which exploit information detectable from the outside of the circuit during cryptographic calculations without intervening on the circuit inputs/outputs. In this category, attacks exploiting the execution time (timing attacks), the direct analysis of the current consumed by the electronic circuit (SPA, simple power analysis), the differential analysis of the consumed current (DPA, differential power analysis), the analysis of the electromagnetic radiation emitted by the circuit (EMA, electromagnetic analysis), be it direct or differential (DEMA, differential electromagnetic analysis), are known.

FIG. 3 schematically illustrates an attack by electromagnetic analysis. An electronic circuit 10 communicates with a terminal 20 (TERM), for example, a smart card reader, be it with or without contact. In the case of a circuit 10 with no autonomous power supply, its power is provided thereto by terminal 20 and it is assumed that it executes cryptographic functions (for example, by means of block 16, FIG. 2). Electromagnetic attacks comprise bringing an antenna 35 of small dimension (having a sensor smaller than that of the circuit to be examined) close to electronic circuit 10 to detect an electromagnetic radiation. This radiation is exploited by a computer system, for example, a microcomputer 30 (PC). The electromagnetic radiation of an electronic circuit being locally different according to the operating elements, knowing the implemented algorithm (which is generally accessible by standards) enables interpreting the radiation to deduce the manipulated quantities therefrom. Unlike attacks by analysis of the consumption or of the execution time, attacks by measurement of the radiation avoid contact with the circuit. Further, the measurement is more local than a measurement of the integrated circuit consumption or of the execution time.

Known systems of countermeasure against attacks by time analysis or by analysis of the circuit power consumption are most often inefficient against electromagnetic attacks, precisely due to the capacity of such attacks to locate the measure.

Algorithms manipulating keys or quantities which are desired to be protected against possible hackings can be divided in two large categories.

A first category concerns public key algorithms such as the RSA, DSA, and EC-DSA algorithms. Such algorithms implement an exponentiation calculation (generally by a so-called square-and-multiply technique) or calculations on elliptic curves (applying an arbitrarily-called add-and-double technique). In all cases, the calculation is different according to the states of the bits of the secret quantity.

In the example of an exponentiation calculation using a square-and-multiply technique, the multiplication step is only performed for the exponent bits at state 1. Accordingly, an unprotected implementation of such a calculation can easily be hacked. It is enough for a hacker to monitor the execution of a step to directly determine the state of the key bit.

FIG. 4 schematically shows a timing diagram illustrating the execution of an exponentiation calculation by the square-and-multiply technique, implementing a protection against timing attacks and attacks by analysis of the electronic circuit consumption.

The input data are a message M to be ciphered and a ciphering key e, expressed in the form of a succession of bits $e_{m-1}, \ldots e_0$.

A first step (block 31, i=m−1;, R0=1) comprises initializing an index counter i to the number of bits minus 1, of quantity e and a result variable R0, for example, stored in a result register, to one.

The calculation is performed in a loop as long as there remains an exponent bit to be processed, starting, for example, from the most significant bit m and decrementing index i (block 32, i=i−1) as long as this index is not zero (test 33, i=0?). When index i is zero (output Y of test 33), the calculation is over and result variable R0 provides value $M^e$. This exponentiation is generally modular.

For each iteration of the loop, it is started (block 34, R0=R0*R0) by squaring up the content of variable R0. Then (test 35 $e_i$=1?), according to the state of the current bit of the exponent, the result of the multiplication of variable R0 by message M updates (block 36, R0=R0*M) this variable R0 itself (case of a current bit at state 1) or updates (block 37, R1=R0*M) a variable R1 useless for the final result (case of a current bit at state 0).

Multiplication operation 37, not needed for the result, is used not only to balance the algorithm execution time whatever the state of the bits of the secret quantity to be processed, but also to balance its consumption.

However, such an algorithm remains sensitive to electromagnetic attacks. Such attacks that bring information of location of the circuit operation enable determining which storage register is modified between two registers respectively assigned to values R0 and R1, thus revealing the value of the current bit of the exponent.

It could be devised to introduce a random quantity into the exponent to mask its value. Such a solution is not sufficient since an analysis of the radiation would enable discovering the scrambled value of the exponent. This value remains exploitable by a hacker if he knows the scrambling process.

A second category of cryptography algorithms relates to so-called secret-key algorithms, for example, the DES algorithm or the AES algorithm.

FIG. 5 schematically illustrates an iteration of a DES algorithm. The DES algorithm comprises several iterations of identical operations by using different sub-keys at each round, which are obtained from a secret key. For simplification, only one intermediary iteration is shown in FIG. 5.

The current data to be manipulated correspond, except for the first iteration, not shown, to the result of the preceding iteration. These data are divided into a left-hand $L_{i-1}$, (block 41) and a right-hand $R_{i-1}$, (block 42) portion stored in registers of identical size and, at the end of the iteration, such registers respectively contain the left-hand $L_i$, (block 41') and right-hand $R_i$, (block 42') portions. Quantity $L_i$, is equal to quantity $R_{i-1}$. Quantity $R_i$, corresponds to the bit-to-bit addition (XOR combination) of quantity $L_{i-1}$, to the result of transformations performed on quantity $R_{i-1}$. A first transformation 43 is an expansion E of quantity $R_{i-1}$, which provides a quantity $E(R_{i-1})$. This expansion is combined bit by bit by an XOR-type combination 45 with a sub-key $K_i$, generated for the current iteration. This sub-key depends, among others, on the previous sub-key $K_{i-1}$, ($K_i=f(K_{i-1})$) and is provided by a sub-key generation function f taking into account the secret key to generate the first sub-key. Result $K_i+E(R_{i-1})$ of combination 45 is submitted to a value substitution function 46 (SB). Result $SB(E(R_{i-1}))+K_i$) of function 46 is submitted to a permutation 47 (P) and result $P(SB(E(R_{i-1}))+K_i)$ of this permutation is combined by function 43 with left-hand portion $L_{i-1}$.

FIG. 6 very schematically illustrates in the form of blocks an example of a substitution function 46 in the case of the DES algorithm. The input data (output of combination 45, FIG. 5) is cut in this example into eight words of 6, bits each $IB_1$, to $IB_8$. Eight tables 461 to 468 (SBOX1 to SBOX8) each substitute a 4-bit word to the 6-bit word that they receive. Each table takes as an input the 6-bit word as an index and returns the value present at this index in the table. In the DES example, each substitution table is formed of 64, elements of four bits each enabling provision of a 4-bit value for each of the $2^6$, possible inputs. The results provided by substitution table 461 to 468 appear in the form of 8, words $OB_1$, to $OB_8$, of four bits each.

As in the case of public-key algorithms, the substitution tables provide values conditioned by the key. An electromagnetic analysis located on the substitution tables may enable going back up to the manipulated secret key by exploiting the registers activated during the substitution which depend on input data IB, and thus on the sub-key.

EP-A-1,548,687, discloses a method in which a register containing the result is selected among two registers involved in the computation. No displacement of value is provided.

SUMMARY OF THE INVENTION

The present invention aims at overcoming all or part of the disadvantages of known methods for masking digital quantities manipulated by an electronic circuit.

The present invention more specifically aims at protecting one or several digital quantities on manipulation thereof by a circuit against attacks of hidden-channel type.

The present invention also aims at attacks by analysis of the electromagnetic radiation of the circuit.

The present invention also aims at a solution which does not weaken the resistance of the calculation against power analysis or timing attacks.

The present invention also aims at a solution applicable to public-key and secret-key algorithms.

To achieve all or part of these objects as well as others, the present invention provides a method for masking a digital quantity used by a calculation executed by an electronic circuit and comprising several iterations, each comprising at least one operation which is a function of at least one value depending on said digital quantity, the method comprising at least one first step of displacement of at least one operand of the operation into a storage element selected independently from said value.

According to an embodiment of the present invention, the method comprises at least a second step of displacement of at least one result of the operation into a storage element selected independently from said value depending on the digital quantity.

According to an embodiment of the present invention, said displacement steps are performed at least before and after each execution of said operation.

According to an embodiment of the present invention, said operation is a multiplication operation of an exponentiation calculation by a square-and-multiply technique, said value being a bit of the exponent.

According to an embodiment, the present invention is applied to an RSA or DSA algorithm.

According to an embodiment of the present invention, said operation is a substitution operation, said value being used as an index of selection of the substituted operands.

According to an embodiment of the present invention, said displacement step is performed at each iteration.

According to an embodiment, the present invention is applied to a DES or AES algorithm.

According to an embodiment of the present invention, the storage element is selected randomly from among a set of available elements.

The present invention also provides an electronic circuit.

The present invention also provides a smart card comprising such a circuit.

The foregoing and other objects, features, and advantages of the present invention will be discussed in detail in the following non-limiting description of specific embodiments in connection with the accompanying drawings.

DETAILED DESCRIPTION

Figure 1:
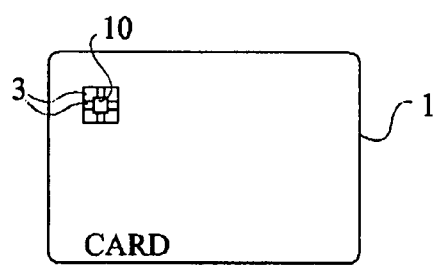
FIG. 1, previously described, shows a smart card of the type to which the present invention applies as an example.
Figure 2:
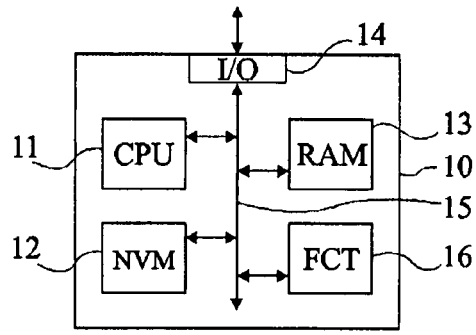
FIG. 2, previously described, very schematically shows an example of an electronic circuit of the type to which the present invention applies.
Figure 3:
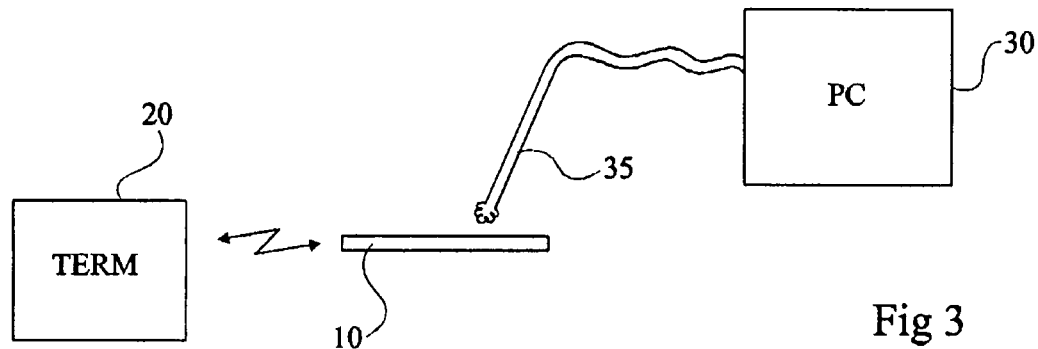
FIG. 3, previously described, illustrates a technique of electromagnetic attack of a calculation performed by an electronic circuit.

The same elements have been designated with the same reference numerals in the different drawings. For clarity, only those steps and elements which are useful to the understanding of the present invention have been shown in the drawings and will be described hereafter. In particular, the exploitation of the calculations processed by the present invention has not been described in detail, the present invention being compatible with any conventional exploitation of public-key or secret-key algorithmic calculations.

A-feature of the present invention is to organize a displacement of one or several operands of an algorithmic calculation in different storage elements selected independently from a value depending on a (secret) digital quantity to be protected. Preferably, this selection is random. In a simplified embodiment, the present invention provides a random permutation between the respective contents of two storage elements storing operands or intermediary results.

The storage elements can be registers or more generally any addressable memory elements, the address of the used storage element or a pointer being stored to find back the contents later.

Figure 7:
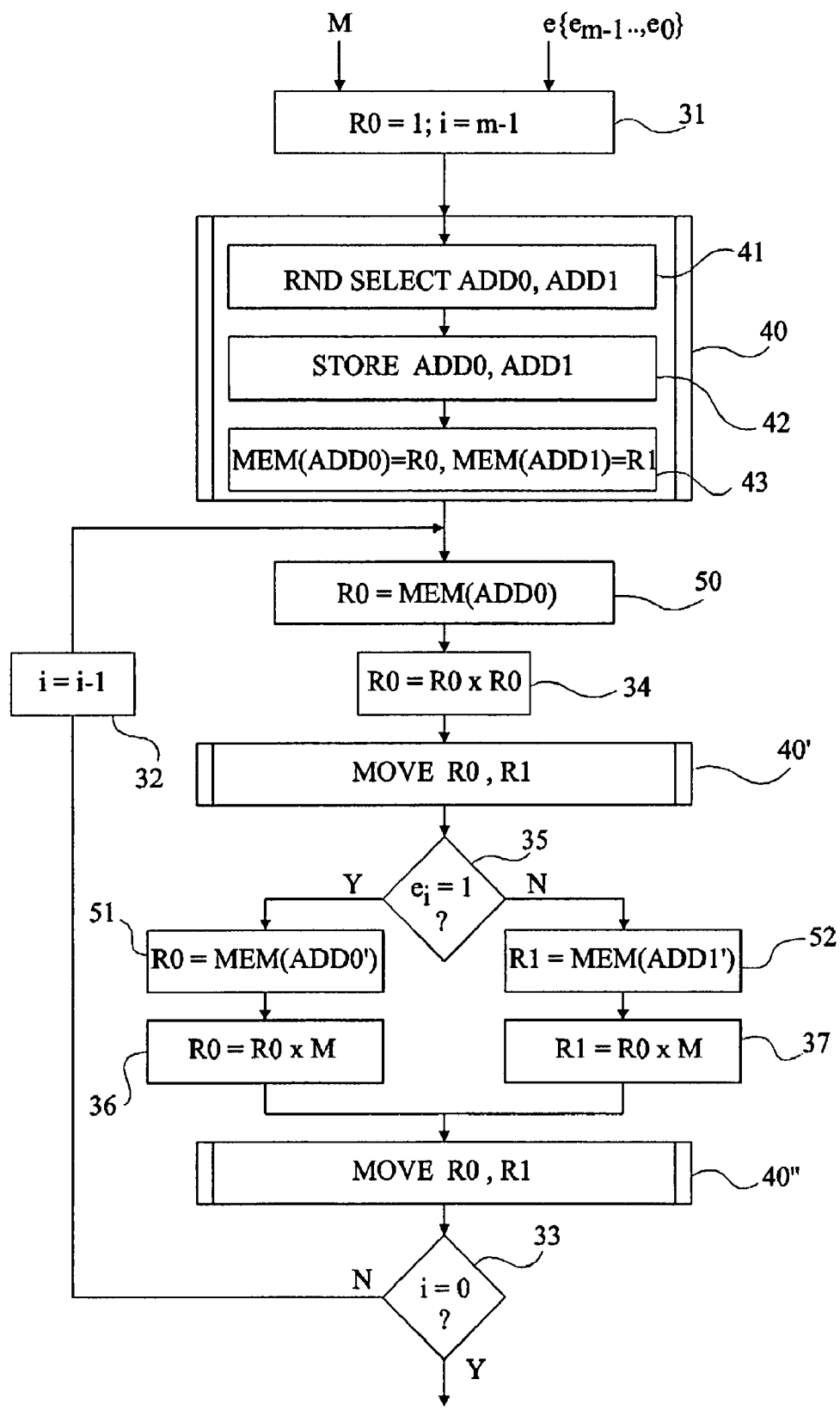
FIG. 7 is a flowchart illustrating an embodiment of the present invention applied to an exponentiation calculation.

FIG. 7 is a flowchart illustrating an embodiment of the present invention, applied to an exponentiation calculation.

As previously, the calculation receives as an input data M to be submitted to an exponentiation by an exponent e, which is a function of a secret quantity and exploited in the form of a set of m bits $e_{m-1}$, to $e_0$. A variable R0 is set to unity and an iteration index i is set to m−1, (block 31, R0=1;, i=m−1). In a preferred embodiment, a second variable R1 is used to mask the execution in time and consumption.

According to this embodiment of the present invention, steps (block 40) organize a storage of variables R0 and R1. These steps successively comprise a random selection of storage addresses (block 41, RNDSELECT ADD0, ADD1) of the two variables R0 and R1. The addresses are randomly selected from an authorized address range, for example, from a possible range of storage in a RAM or in a group of selectable registers. In the case where more than two addresses are available, that is, when a simple permutation is considered not to be enough, these addresses are stored (block 42, STORE ADD0, ADD1), for example in dedicated registers. The fact that the actual addresses are stored in the clear does not affect the security of the manipulated data, as will be seen hereafter. Then, the content of variable R0 is stored at address ADD0 and the content of variable R1 is stored at address ADD1 (block 43, MEM(ADD0)=R0, MEM(ADD1)=R1). This storage may use intermediary registers, that is, values R0 and R1 remain contained in dedicated temporary registers (for example at the input and/or the output of operators in wired logic) before transfer towards the elements storing addresses ADD1 and ADD0. These elements may besides be these registers, provided to have a third element to perform the permutation between the contents of the two temporary registers.

Then start the algorithm iterations on result variable R0.

Each iteration starts with a reading 50 (R0=MEM(ADD0)) of the content of address ADD0 to obtain variable R0. Then, conventional squaring step 34 (R0=R0*R0) is performed. Preferably, a process of random displacement in the memory is performed at the end of step 34. This process is globally illustrated by a block 40' (MOVE R0, R1) and resumes states 41, 42, 43 described hereabove.

Test 35 on the exponent bit ($e_i$=1, ?) is performed to condition the next steps. In the case of a bit at state 1, variable R0 is loaded (block 51, R0=MEM(ADD0')) with the content of address ADD0' which corresponds to that selected at step 40'. Then, multiplication step 36 (R0=R0*M) is executed. In the case of an exponent bit at state 0, variable R1 is loaded with the content of address ADD1' selected at step 40' (block 52, R1=MEM(ADD1')). Then, time and consumption masking step 37 (R1=R0*M) is executed.

Finally, before performing test 33 (i=0, ?) on the end of the calculation, a random displacement 40" of variables R0 and R1 is preferably performed.

Figure 4:
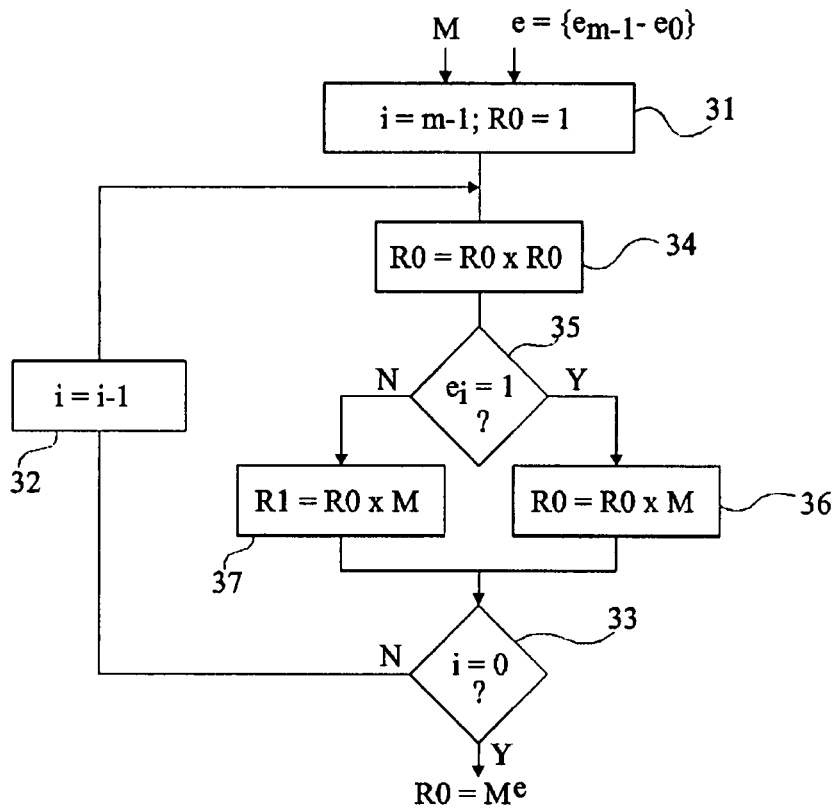
FIG. 4, previously described, is a flowchart describing a conventional example of implementation of an exponentiation calculation by a square-and-multiply technique.
Figure 5:
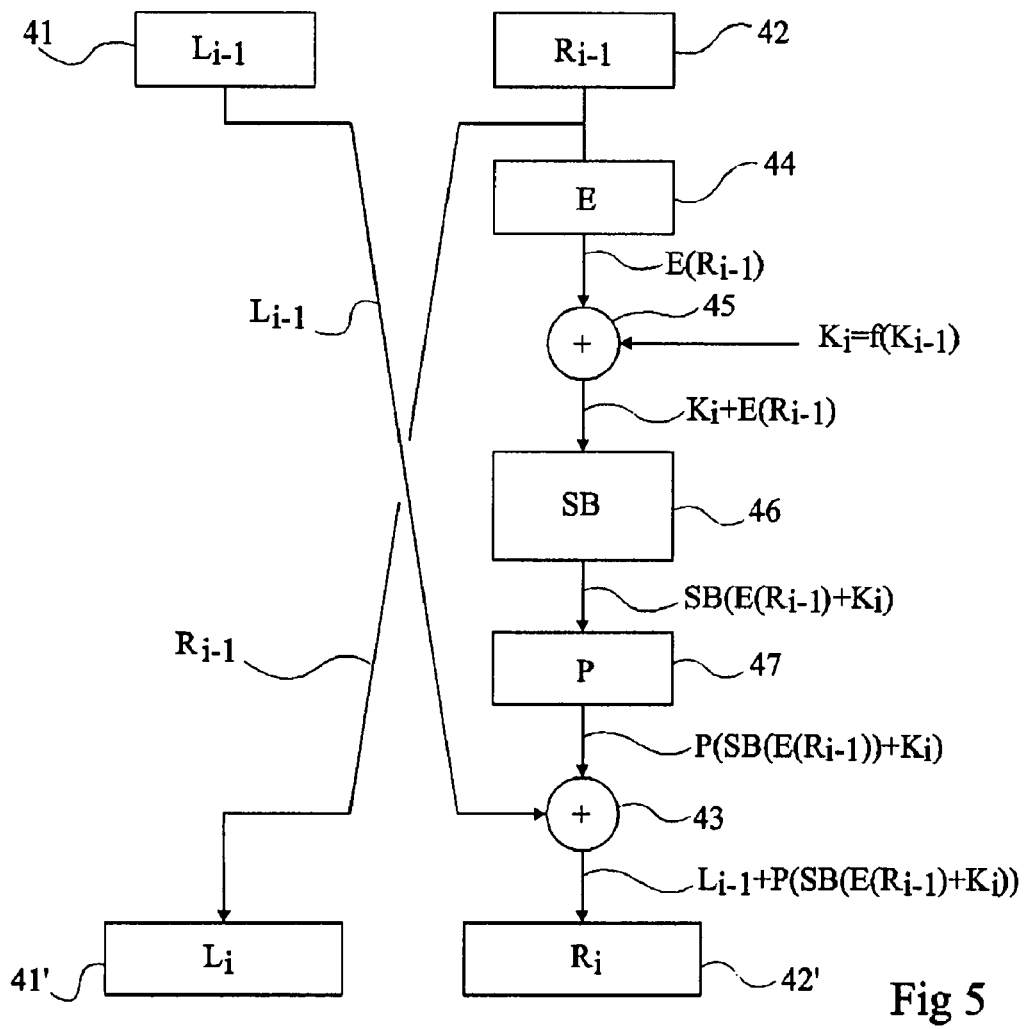
FIG. 5, previously described, very schematically shows an iteration of a DES algorithm.
Figure 6:
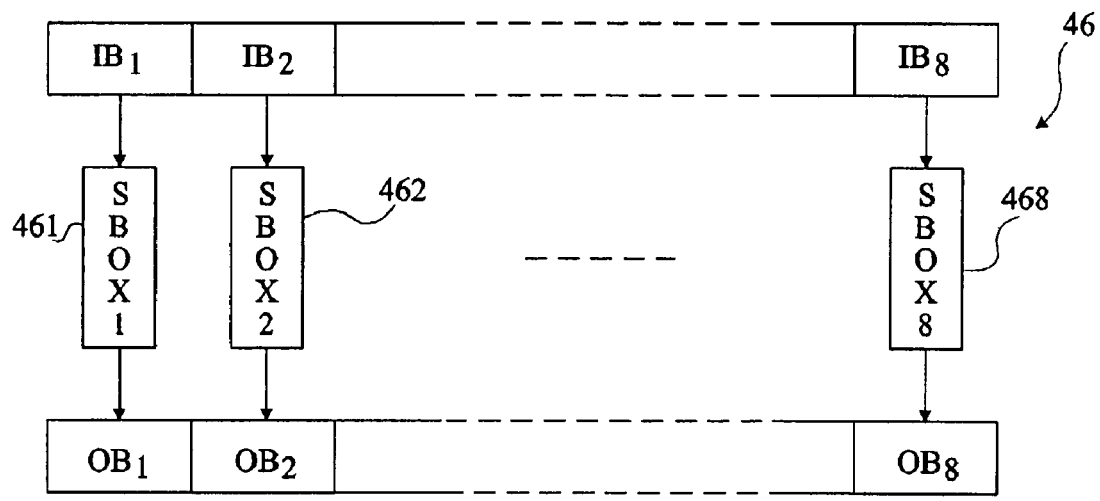
FIG. 6 very schematically illustrates in the form of blocks the execution of a substitution function in a secret-key algorithm.

The rest of the process is identical to that exposed in relation with FIG. 4, that is, a decrement (bock 32, i=i−1) of the index as long as it is not zero. At the end of the calculation, address ADD0" selected at last step 40" provides result Me.

As a variation, the reading of the storage elements to recover one of variables R0 or R1 (blocks 50, 51, and 52) is replaced by a reading of the two variables each time.

According to another variation, first displacement step 40 is omitted.

An advantage of the embodiment of FIG. 7 is that local electromagnetic radiation measurements of the circuit at the level of registers or storage elements storing variables R0 and R1 on execution of calculation 34, 36, or 37 do not enable determining the state of the current bit of the secret quantity. The fact of displacing in the memory variables R0 and R1 before and after the operation of processing of the exponent bit, whatever the state of this bit, prevents from determining the updated variable R1 or R0, and thus whether the performed operation is operation 36 or 37.

The fact of displacing the variables at each iteration before and after the critical operation avoids for a comparative observation of calculation 34 with respect to calculation 36 or 37 to enable differentiating the multiplication performed with variable R1 from that performed with variable R0.

Figure 8:
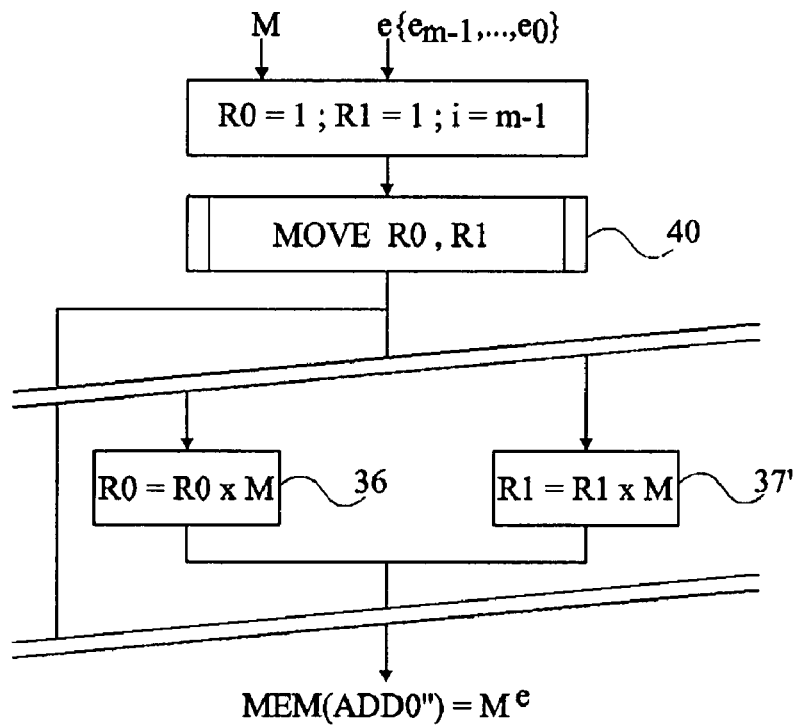
FIG. 8 is a partial flowchart illustrating a variation applied to the exponentiation calculation.

FIG. 8 illustrates, in a partial flowchart, a variation of the method of the present invention applied to a square-and-multiply calculation. According to this variation, step 37 of updating of variable R1 is replaced with a step 37' in which message M is multiplied by the preceding content of variable R1 instead of by the content of variable R0. The rest of the steps is identical to those discussed in relation with FIG. 7.

An advantage of this variation is that this protects the algorithm execution even if a hacker is capable of determining, by electromagnetic observation, whether the operand of the multiplication is placed, before displacement, at the same location as the result. Such an observation could, in the embodiment of FIG. 7, enable determining whether the circuit performs operation 36 or 37 and thus finding a bit of the exponent. By always temporarily placing the result at the same location as the operand, the embodiment of FIG. 8 enables guarding against such a possible attack.

According to a simplified embodiment, the random displacement of the variables may comprise a random exchange of data R0 and R1 between two storage elements. In this case, the storage of the storage address may be simplified as a simple flag or pointer to determine whether the first register contains value R0 and the second one contains value R1, or conversely.

The implementation of the present invention requires permanently knowing where the variables are stored, and thus storing addresses ADD0 and ADD1 (or a flag bit in case of a simple permutation). The fact that the address or the flag are readable by the attacker, however, provides no information about the manipulated quantity since the selection of the variable storage location has no link with this quantity.

Figure 9:
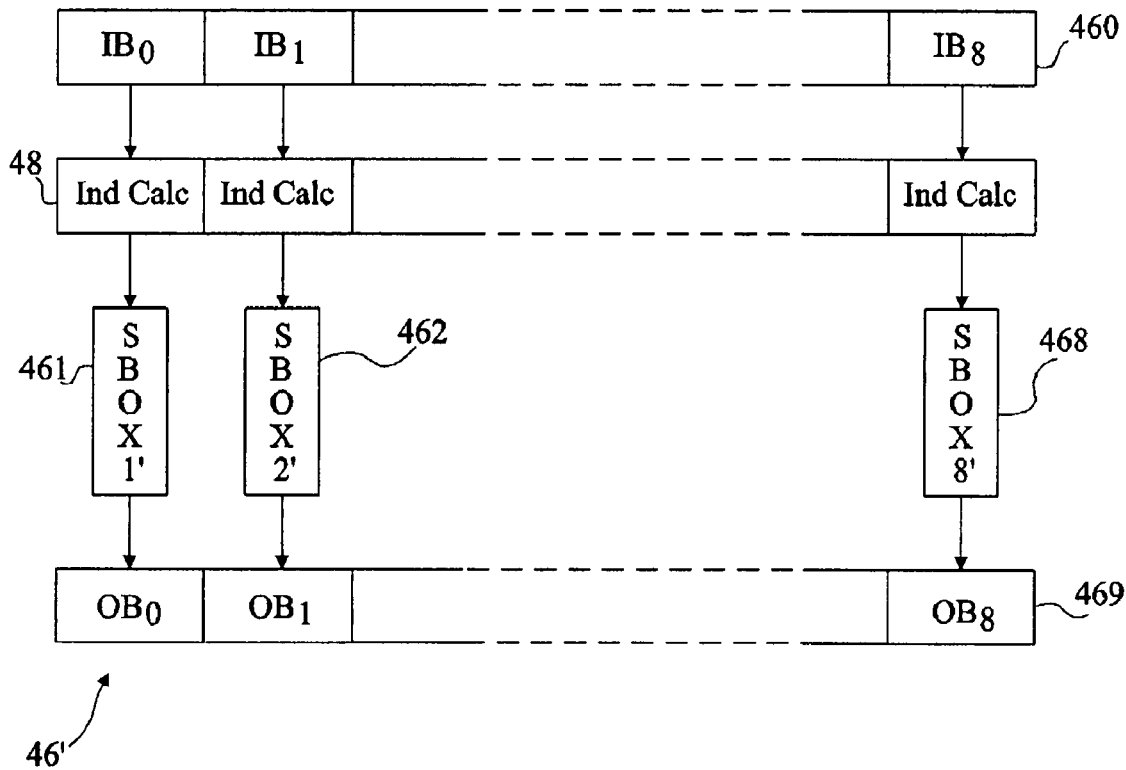
FIG. 9 is a schematic block diagram illustrating an embodiment of the present invention applied to substitution tables of a DES algorithm.

FIG. 9 very schematically illustrates in the form of blocks an embodiment of the present invention applied to a DES-type secret key algorithm. In this example, a processing 46' in substitution tables of a DES algorithm processing input data 460 divided into eight words $IB_1$, to $IB_8$, (for example, of 6, bits each) and providing output data 469 formed of eight words $OB_1$, to $OB_8$, (for example, of 4, bits each) is assumed. According to this embodiment of the present invention, the elements of substitution tables 461 to 468 (SBOX1'to SBOX8') which form the critical elements for the security of the manipulated data are submitted to a random permutation (or to a displacement to randomly-selected addresses). Such a manipulation of the values requires being able to determine the index of the element in the table, which amounts to an addressing as in the method disclosed hereabove in relation with the square-and-multiply technique. This functionality is illustrated in FIG. 9 by the insertion, between each input word and the table which is associated therewith, of an index calculation or index conversion block 48 according to the manipulation performed on the table elements. Here again, the conversion of the index of block 48 provides no indication on the manipulated secret quantity.

The displacement of the table elements may be performed at each new execution of the algorithm or at each round (iteration).

Of course, the present invention is likely to have various alterations, modifications, and improvements which will readily occur to those skilled in the art. In particular, although it has been more specifically described in relation with a square-and-multiply technique, the present invention applies to any algorithm temporarily storing one or several operands (variables R0, R1, or a value returned by an SBOX) of an operation having an execution directly (bit of exponent e) or indirectly (selection index in the SBOX) depending on a digital quantity to be protected. For example, the present invention applies to calculations known as "exponentiations", "k.P" in elliptic curves, "substitution boxes". Further, the present invention is compatible with any other countermeasure, for example, with the methods introducing random quantities in the manipulated values. Further, the practical implementation of the present invention is within the abilities of those skilled in the art, using hardware and/or software tools conventional per se.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for masking a secret digital quantity used by a calculation executed by an electronic circuit and comprising several iterations, each comprising at least one operation which is a function of at least one value depending on said secret digital quantity, comprising, each of the several iterations of the calculation including randomly selecting, by the electronic circuit, at least one address and displacing, by the electronic circuit, at least one operand used in the operation into a storage element having the randomly selected address, so as to protect said secret digital quantity against attack, wherein the at least one operand is displaced, during each iteration of the calculation, to a storage element having an address that is variable according to the random address selection performed during each iteration.

2. The method of claim 1, comprising at least a second step of displacement of at least one result of the operation into a storage element having a randomly selected address.

3. The method of claim 2, wherein said displacement steps are performed at least before and after each execution of said operation.

4. The method of claim 2, wherein said operation is a multiplication operation of an exponentiation calculation by a square-and-multiply technique, said value being a bit of the exponent.

5. The method of claim 1, applied to an RSA or DSA algorithm.

6. The method of claim 1, wherein said operation is a substitution operation, said value being used as an index of selection of the substituted operands.

7. The method of claim 6, wherein said displacement step is performed at each iteration.

8. The method of claim 1, applied to a DES or AES algorithm.

9. The method of claim 1, wherein the storage element is selected randomly from among a set of available elements.

10. An electronic circuit configured to implement the method of claim 1.

11. A smart card comprising the circuit of claim 10.

12. A method for masking a secret digital quantity used in a calculation executed by an electronic circuit, the calculation including several iterations, each of the several iterations comprising:
   randomly selecting, by the electronic circuit, at least one storage address;
   displacing, by the electronic circuit, at least one operand to a storage element having the randomly selected storage address, the operand depending on the secret digital quantity and being used in an operation of the calculation, the displacing protecting the secret digital quantity against attack; and
   executing, by the electronic circuit, the operation of the calculation using the displaced operand, wherein the at least one operand is displaced, during each iteration of the calculation, to a storage element having an address that is variable according to the random address selection performed during each iteration.

13. A method as defined in claim 12, further comprising repeating, by the electronic circuit, the acts of displacing at least one operand and executing the operation, for each iteration of the calculation.

14. A method as defined in claim 12, further comprising displacing, by the electronic circuit, at least one result of the operation, to a storage element having a randomly selected storage address.

15. A method as defined in claim 14, further comprising repeating, by the electronic circuit, the acts of displacing at least one operand, executing the operation and displacing a result of the operation, for each iteration of the calculation.

16. A method as defined in claim 12, wherein the randomly selected storage address is selected from a range of storage addresses.

17. A method as defined in claim 12, wherein the randomly selected storage address is stored in a dedicated register.

18. A method as defined in claim 12, wherein the storage address is randomly selected from two storage elements.

19. A method as defined in claim 12, wherein the operation is a multiplication operation of an exponentiation calculation by a square-and-multiply technique.

20. A method as defined in claim 12, wherein the operation is a substitution operation.

* * * * *